2,928,834
2-N-METHYLPIPERAZINE-1-PHENYLETHYL BENZOATES

Seymour L. Shapiro, Hastings on Hudson, Louis Freedman, Bronxville, and Harold Soloway, Yonkers, N.Y., assignors to U.S. Vitamin & Pharmaceutical Corporation, New York, N.Y., a corporation of Delaware No Drawing. Application July 18, 1958
Serial No. 749,310

6 Claims. (Cl. 260—268)

This invention is concerned with benzoate esters which are unusually effective as hypotensive agents. In particular, the invention is concerned with compounds of the following structure

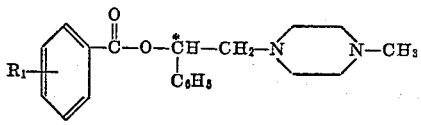

wherein R is selected from the group of substituents consisting of hydrogen, lower alkyl, lower alkoxy, halogen and hydroxy.

In a broader degree, the benzoyl group may be disubstituted with the R groups being alike or different, or other aryl groups such as thienoyl, furoyl, nicotinyl and the like may be employed.

The hypotensive response with the amino esters of this invention does not require that the amino group be quaternized. The quaternary type antihypertensive agents are clinically recognized as being characterized by poor and unpredictable absorption upon oral administration.

The compounds of this invention, being amino esters, are readily converted to mono-acid salts with the mineral acids such as hydrochloric, hydrobromic, nitric, sulfuric and phosphoric acids, and with organic acids such as lactic, malic, tartaric and acetic acids, and with acidic organic compounds such as theophylline, 8-chlorotheophylline and the like. Since two basic nitrogen atoms are present, diacid salts such as dihydrochlorides can be prepared. The selection of the acid is such that the formed salt affords no noted toxicity beyond that which is characteristic of the free base.

The compounds above have an asymmetric carbon atom (shown by the asterisk above), and the racemic mixture and the individual "d" and "l" forms which might be resolved by techniques familiar to those skilled in the art, are to be considered within the purview of this invention.

As illustrative of the pharmacological activity of the compounds of this invention, the hypotensive response obtained in the anesthetized dog is given in Table I.

TABLE I.—HYPOTENSIVE RESPONSE

| $R_1$ | $LD_{min.}$[a] | Blood Pressure Response[b] |
|---|---|---|
| H | 750 | 2+ |
| 2-$CH_3O$- | 500 | 3+ |
| 2-$C_2H_5O$- | 500 | 3+ |
| Hexamethonium | | 3+ |

[a] The minimum lethal dose ($LD_{min.}$) was established subcutaneously in mice and is expressed as mg./kg.
[b] Activities were established by intravenous administration of the compounds of anesthetized (Nembutal, 30 mg./kg.) dogs at dosage levels corresponding to 1/100 $LD_{min.}$ mg./kg. as establ'shed in mice. In no instance was a dosage higher than 5 mg./kg. used. The blood pressure response has been classified as 3+=sustained and marked hypotension (20 mm. or more); 2+=sustained and moderate hypotension (5–20 mm.); 0=no response noted.

The compounds are conveniently prepared by reaction of the suitably substituted benzoyl chloride with 2-N-methylpiperizino-1-phenylethanol in an inert organic solvent such as benzene, dimethylformamide or acetonitrile. The product as the monohydrochloride precipitates from the reaction medium and can be recrystallized. If it does not precipitate, the solvent is evaporated under reduced pressure and the residue of solid product recrystallized.

In turn, the formed hydrochloride can be dissolved in water, the solution cautiously made basic with sodium hydroxide solution and the free base of the product extracted into an organic solvent such as ether. The ether solution is evaporated and the residue of product distilled. Salts of the distilled base can be formed by treatment with one or two equivalents of the desired acid.

We have found, however, that the most convenient preparative method is to add an additional equivalent of hydrogen chloride in ethanol to the formed monohydrochloride to precipitate the dihydrochloride.

The process and compounds of this invention will be more clearly understood from a consideration of the following specific examples which are given for the purpose of illustration only and are not to be construed as limiting the scope of the invention in any way.

*Example 1.—2-(methyl-1-piperazine)-1-phenylethanol*

Styrene oxide (60 g., 0.5 mole) was added over 30 minutes to 75 g. (0.75 mole) of stirred, refluxing N-methylpiperazine. After refluxing and stirring for 2.5 hours and standing 20 hours the formed product crystallized. Trituration and filtration gave 93.4 g. (81%), melting at 88–91°.

A sample recrystallized from hexane melted at 95–96°.
Analysis.—Calcd. for $C_{13}H_{20}N_2O$: C, 70.9; H, 9.2; N, 12.7. Found: C, 70.9; H, 9.1; N, 12.8.

*Example 2.—2-(4-methyl-1-piperazine)-1-phenylethyl benzoate dihydrochloride*

A solution of 6.6 g. (0.03 mole) of 2-(4-methyl-1-piperazine)-1-phenylethanol in 75 ml. of benzene was added over 30 minutes to a stirred solution of 4.2 g. (0.03 mole) of benzoyl chloride in 100 ml. of refluxing benzene. Precipitation occurred immediately. Reflux and stirring were continued for 2 hours. When cool, the monohydrochloride of the product was separated, 6.6 g. (60%). This was converted to the dihydrochloride by treatment with 10 ml. of 10% ethanolic hydrogen chloride. Filtration and recrystallization from ethanol gave 21% of the pure dihydrochloride, melting at 220–223°.
Analysis.—Calcd. for $C_{20}H_{24}Cl_2N_2O_2$: C, 60.5; H, 6.6; N, 7.1. Found: C, 60.5; H, 6.9; N, 7.4.

In a similar manner using p-chlorobenzoyl chloride and p-toluylchloride, the corresponding p-chlorobenzoate and p-methylbenzoates are prepared.

*Example 3.—2-(4-methyl-1-piperazine)-1-phenylethyl o-methoxybenzoate dihydrochloride* o-Methoxybenzoyl chloride (5.6 g., 0.033 mole) was added over 10 minutes to a stirred suspension of 6.6 g. (0.03 mole) of 2-(4-methyl-1-piperazine)-1-phenylethanol in 50 ml. of dimethylformamide. An exothermic reaction ensued and the solid dissolved. After standing for 5 days, a solution of 2.2 g. of hydrogen chloride in 25 ml. of ethanol was added, resulting in a fine crystalline precipitate. After 15 minutes, filtration gave 7.5 g. (59%), melting at 193–200°. Recrystallization first from methanol, then from a mixture of acetone and methanol gave the product, melting at 211–213°.
Analysis.—Calcd. for $C_{21}H_{28}Cl_2N_2O_3$: C, 59.0; H, 6.6; N, 6.6. Found: C, 59.1; H, 6.6; N, 6.8.

In a similar manner using anisoyl chloride, the corresponding p-methoxy benzoate is prepared.

*Example 4.—2-(4-methyl-1-piperazine)-1-phenylethyl o-ethoxybenzoate dihydrochloride*

This compound was prepared by the method of Example 3, using 5.5 g. (0.03 mole) of o-ethoxybenzoyl chloride, 6.6 g. (0.03 mole) of 2-(4-methyl-1-piperazine)-1-phenylethanol and 100 ml. of benzene. Since only negligible precipitation occurred, the solvent was removed at diminished pressure and the residue triturated with dry ether to give 8.4 g. of solid. On dissolving this product in 25 ml. of ethanol and treating with 10 ml. of 10% ethanolic hydrogen chloride, the dihydrochloride precipitated weighing 7.7 g. (58%). Recrystallization first from ethanol, then from isopropanol gave the product, melting at 185–188°.

*Analysis.*—Calcd. for $C_{22}H_{30}Cl_2N_2O_3$: C, 59.9; H, 6.9; N, 6.4. Found: C, 60.1; H, 6.8; N, 6.5.

In a similar manner using p-ethoxybenzoyl chloride, the corresponding p-ethoxybenzoate is prepared.

For therapeutic purposes the compounds of this invention are formulated to contain 5–50 mg. of active ingredient desirably as the dihydrochloride in a pharmaceutical extender, which does not co-act with the active principle described herein.

It is to be understood that it is intended to cover all changes and modifications of the invention herein chosen for the purposes of illustration which do not constitute departure from the spirit and scope of the invention.

We claim:

1. A compound of the formula

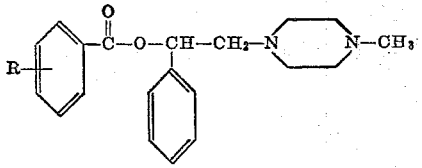

wherein R is selected from the group consisting of hydrogen, lower alkoxy having a carbon content $C_1$–$C_2$, methyl, halogen, and hydroxy.

2. The compound

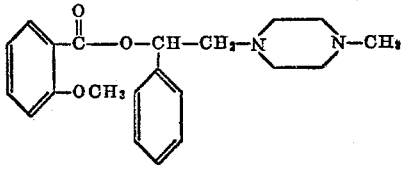

3. The compound

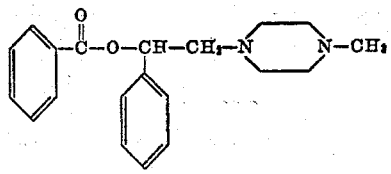

4. The compound

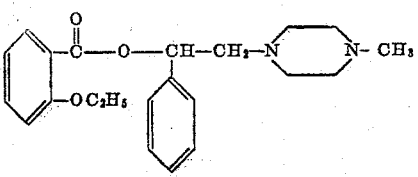

5. The compound

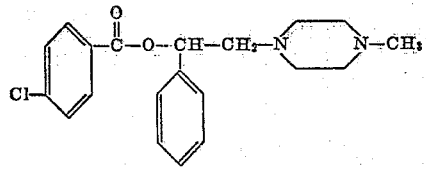

6. The compound

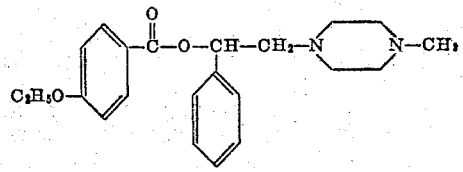

References Cited in the file of this patent

UNITED STATES PATENTS

| | | |
|---|---|---|
| 2,383,074 | Parker et al. | Aug. 21, 1945 |
| 2,628,973 | Cusic | Feb. 17, 1953 |